(12) United States Patent
Cole

(10) Patent No.: US 6,224,302 B1
(45) Date of Patent: May 1, 2001

(54) SPADE DRILL

(75) Inventor: John M. Cole, Oxford, MI (US)

(73) Assignee: Cole Carbide Industries, Inc., Warren, MI (US)

( * ) Notice: Subject to any disclaimer, the term of this patent is extended or adjusted under 35 U.S.C. 154(b) by 0 days.

(21) Appl. No.: 09/501,387

(22) Filed: Feb. 9, 2000

Related U.S. Application Data
(60) Provisional application No. 60/119,436, filed on Feb. 10, 1999.

(51) Int. Cl.[7] ..................................................... B23B 51/00
(52) U.S. Cl. ........................... 408/224; 408/223; 408/713
(58) Field of Search ..................................... 408/199, 223, 408/224, 227, 713

(56) References Cited

U.S. PATENT DOCUMENTS

| | | |
|---|---|---|
| 2,575,239 | 11/1951 | Stephens . |
| 2,621,548 * | 12/1952 | Williams .............................. 408/233 |
| 2,930,264 * | 3/1960 | Lovret .................................. 408/229 |
| 3,333,489 * | 8/1967 | Mossberg ............................. 408/233 |
| 3,443,459 * | 5/1969 | Mackey et al. ..................... 408/230 |
| 4,040,764 * | 8/1977 | Baturka ................................. 408/59 |
| 4,060,335 | 11/1977 | Holloway et al. . |
| 4,251,172 * | 2/1981 | Durand ................................ 408/233 |
| 4,595,322 * | 6/1986 | Clement .............................. 408/224 |
| 5,099,933 * | 3/1992 | Schmike et al. .................... 408/216 |
| 5,632,576 | 5/1997 | Storch . |
| 5,700,113 * | 12/1997 | Stone et al. ........................ 408/1 R |
| 5,782,589 | 7/1998 | Cole . |
| 5,957,635 * | 9/1999 | Nuzzi et al. ........................ 408/231 |
| 6,026,916 * | 2/2000 | Briese .................................. 175/336 |
| 6,044,919 * | 4/2000 | Briese .................................. 175/417 |

FOREIGN PATENT DOCUMENTS

| | | |
|---|---|---|
| 686345 A5 | 3/1996 | (CH) . |
| 0188806 * | 11/1987 | (EP) ..................................... 408/227 |
| 5-0040208 * | 3/1983 | (JP) ..................................... 408/230 |
| 1346359A * | 10/1987 | (SU) .................................... 408/227 |

OTHER PUBLICATIONS

Allied Machine & Engineering Corp., "Throw–Away Sytle—Drills & Holders", (Jan. 1991) pp. 1–13, Catalog No. 1–91–TAC.

Gairing Tools, "Conner–Type Spade Drills & Core Drills", (1953) pp. 12–26.

Millstar, "Copy Milling and Profiling Cutters", (1995) pp. 2–7, Catalog No. MS–95.

* cited by examiner

*Primary Examiner*—A. L. Wellington
*Assistant Examiner*—Monica S. Carter
(74) *Attorney, Agent, or Firm*—Harness, Dickey & Pierce, P.L.C.

(57) ABSTRACT

A spade drill is provided including a V-shaped drill cutting end and a pair of reaming edges on each side thereof. The reaming edges have a relatively large radius of curvature and generally define a flat portion at the apex of the reaming edges. The junction between the drill cutting end and the reaming edges has a misblended radius.

4 Claims, 3 Drawing Sheets

SPADE DRILL

This Application claims benefit of Provisional Application No. 60/119,436 filed Feb. 10, 1999.

BACKGROUND OF THE INVENTION

FIELD OF THE INVENTION

The present invention relates generally to a spade drill, and more particularly to a spade drill having the ability to drill as well as ream a hole simultaneously.

BACKGROUND AND SUMMARY OF THE INVENTION

There are many circumstances in the manufacturing industry that require the task of drilling a hole while leaving the hole somewhat undersized and then following behind the drilling operation with a secondary operation with a reamer to size the hole to the desired size. The number of operations that are required to manufacture a part is directly related to the cost of the part. Thus, it is desirable to provide a drill with the ability to drill as well as ream a hole simultaneously.

Accordingly, the spade drill of the present invention has the ability to drill as well as ream a hole simultaneously thereby eliminating the requirement for a secondary reaming operation after a hole is drilled. The spade drill includes a V-shaped drill cutting and a pair of reaming edges on each side thereof. The reaming edges have a relatively large radius of curvature and generally define a flat portion at the apex of the reaming edges.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
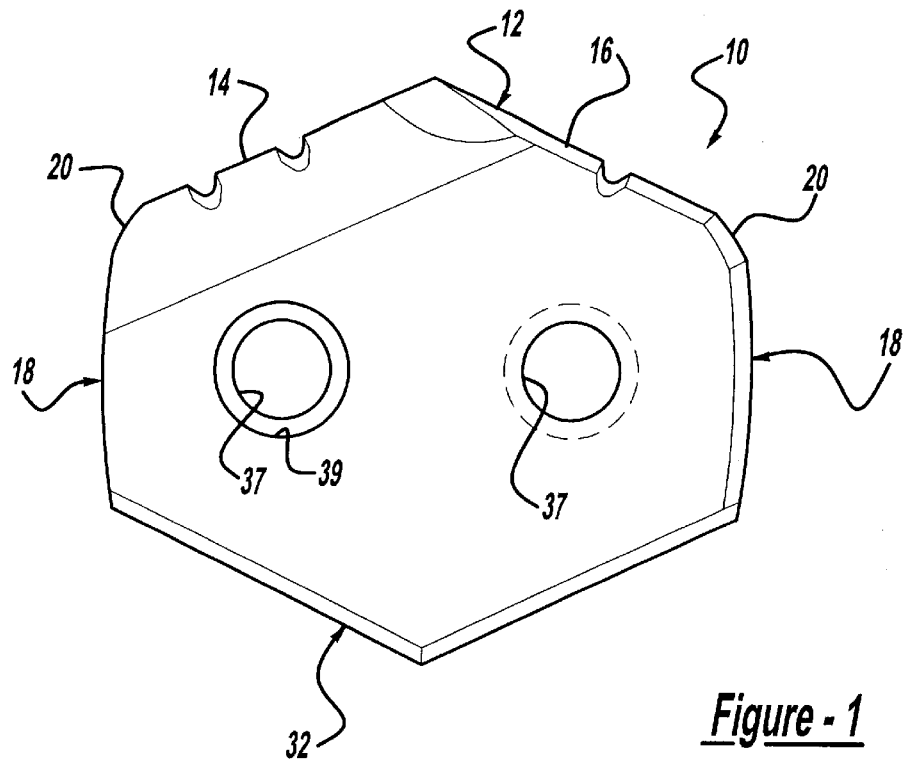
FIG. 1 is a side view of the spade drill according to the principles of the present invention illustrating the miss-blended radius between the drill section and sides.
Figure 2:
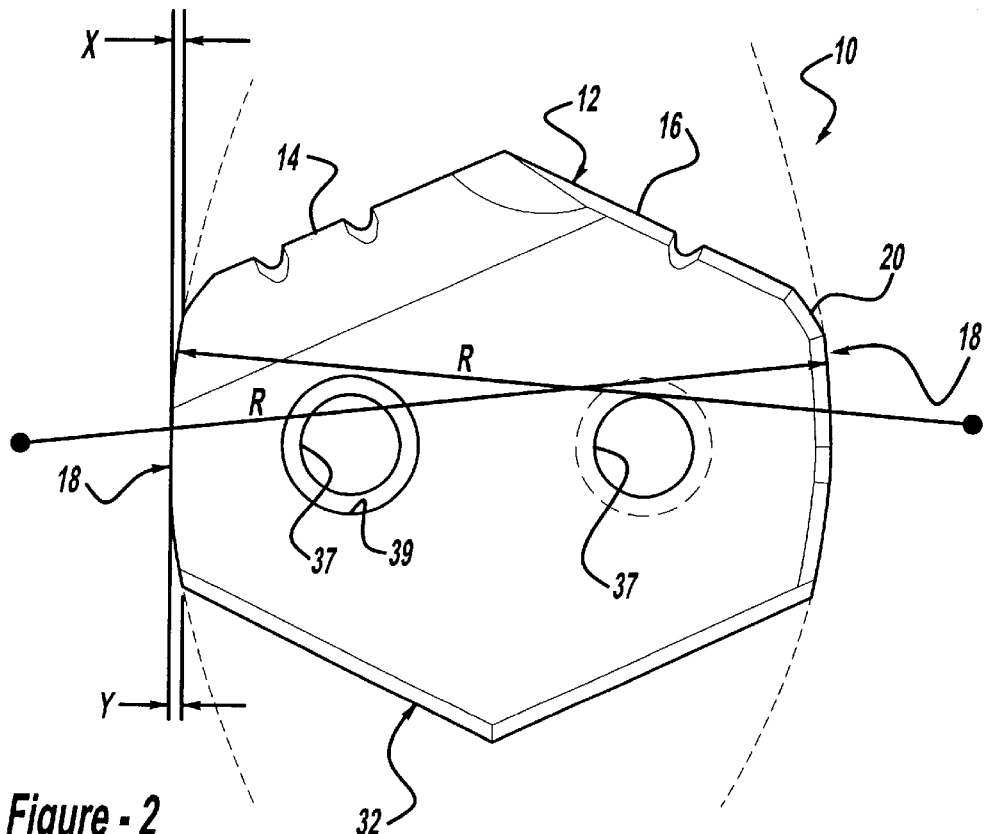
FIG. 2 is a side view of the spade drill shown in FIG. 1, illustrating the reaming radius.

With reference to FIGS. 1–5, the spade drill of the present invention will be described.

The spade drill 10 includes a generally V-shaped drill cutting end 12 with a first cutting edge 14 and a second cutting edge 16 on opposite sides of the spade drill. At the outer diameter of the cutting edges 14, 16 each opposing side 18 has a radius 20 that is not tangent to the cutting edge 14, 16 or the diameter of the side of the drill portion and is thus mis-blended on both portions of the cutting edge 14, 16 and on the sides 18. This mis-blended radius 20 has two purposes; (1) it provides for the centering effect of the drill as the drill enters the workpiece in its rotational mode; and (2) it provides for a gradual breakdown or a barrier to prolong the natural wear that occurs as the drill endures through its normal breakdown.

In comparison with other shapes such as a full tangent radius, or angular edge, the outer edge tends to chip or break causing the drill to become unbalanced as well as unable to maintain its triangular indicated reading which is required to produce the self-centering effect. This also causes the diameter to be affected dimensionally, hence causing premature tool failure.

Figure 3:
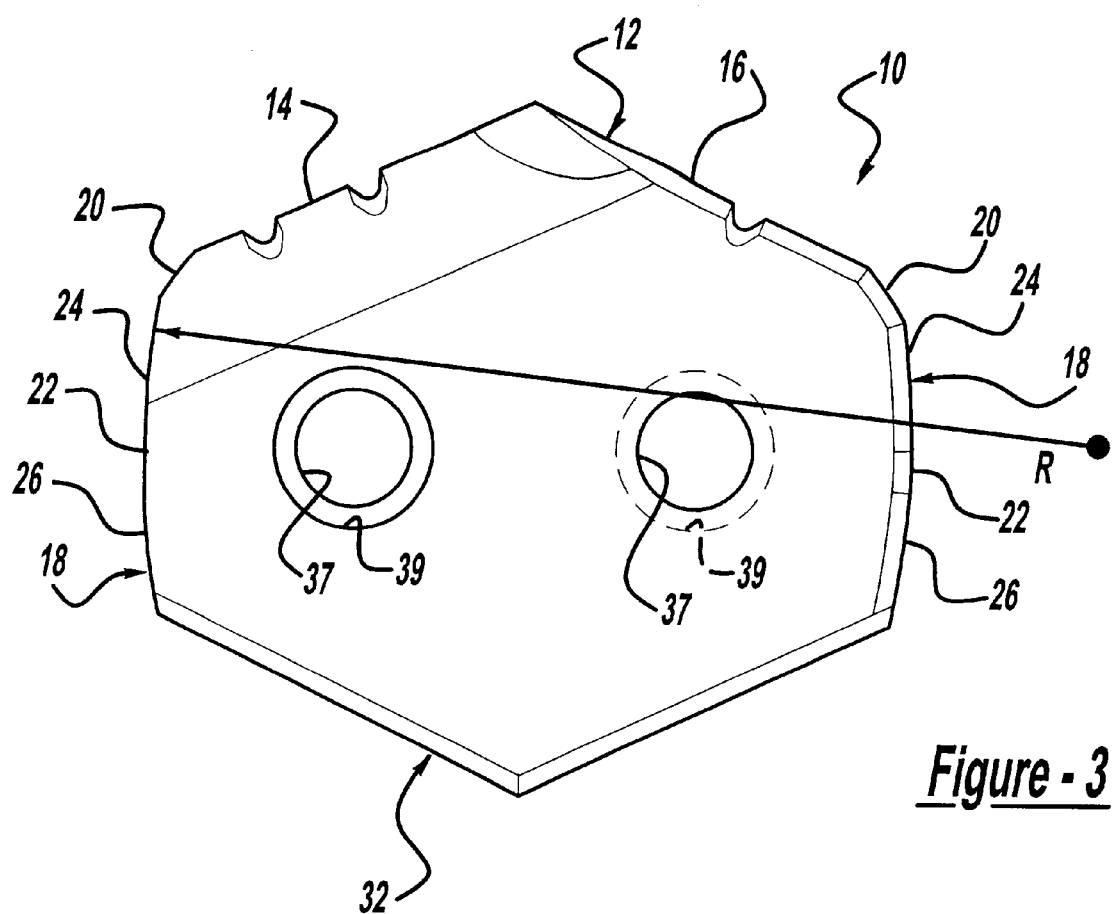
FIG. 3 is a side view of the spade drill shown in FIG. 1 illustrating the flats on each reaming section.

As shown in FIG. 3, the sides 18 of the spade drill have a reaming feature including a large radius "R" on opposing sides 18 of the spade drill which is not tangent "mis-blended" to the cutting edges 14, 16 of the drill section 12 and to the trailing end. The sides 18 perpendicular to the drill cutting face 12 has a flat 22 in the center of the farthest most distant diametrical point of the radius "R". The radius "R" which is shown is greater than a width of the spade drill 10.

As is commonly known in the art of reaming, a reamer must be allowed to pass through a hole that is smaller in diameter than the size of the reaming device. This in turn creates a wiping action or a burnishing effect which creates the hole size required. As shown in FIG. 3, the trailing side sections 18 are identical in design where the non-tangent radius "R" of the sides 18 expand the pre-drilled hole for the expansion of the hole by a distance X shown in FIG. 2. Since the radius portion of the sides are not tangent, this provides a self-centering device. The identical flats 22 provided on the opposite sides 18 in effect act as wipers to burnish the whole diameter.

The length of the flats 22 are determined by the rotational versus linear insertion rate. The determining factor for the length of the flats 22 is that the rotation of the spade drill 10 correlates with the down feed such that the rotating flats 22 overlap as they are fed in a downward or upward direction effectively reaming the hole diameter. It should be noted that the sides 18 have a radiused portion 24, 26 on each side of the flats 22 so that the spade drill provides a reaming function both upon insertion and withdrawal of the spade drill 10 from the hole which has been drilled.

Figure 4A:
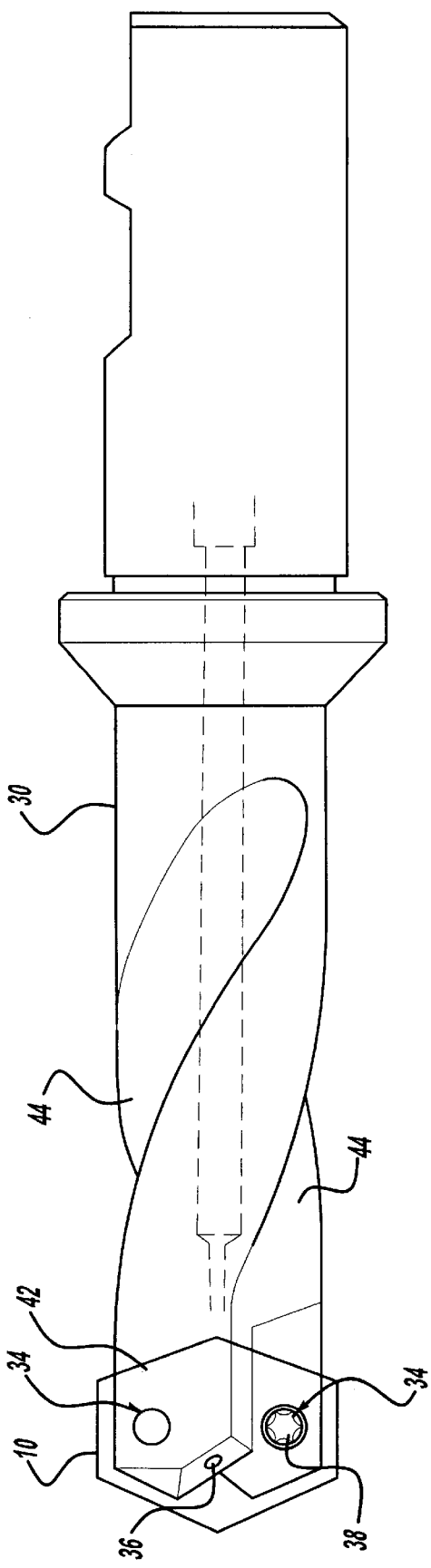
FIGS. 4A and 4B are side and end views, respectively, of the tool holder for supporting the spade drill according to the present invention.
Figure 4B:
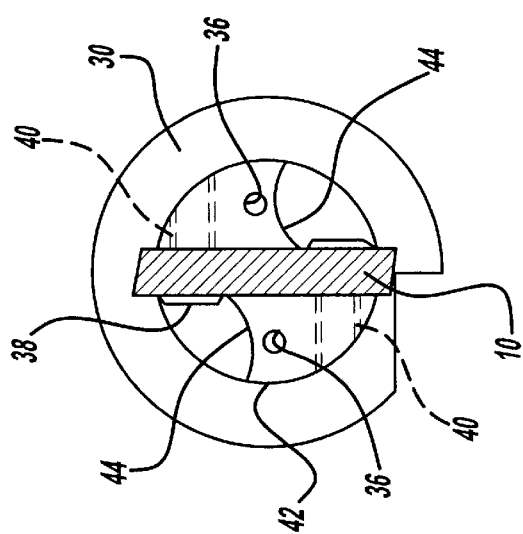

The spade drill 10 of the present invention is mounted in a holder 30 as shown in FIG. 4 which is provided with a V-shaped pocket for receiving the V-shaped base 32 of the spade drill 10. The spade drill 10 is secured to the holder by a pair of threaded fasteners 34 which are inserted from opposite sides of the tool holder 30. Cooling passages 36 are provided in the tool holder for blowing coolant at the drilling contact surface. The coolant passages also provide the function of assisting in removing metal fragments which are removed from the workpiece. The screws 34 which are inserted through holes 37 of the spade drill 10 have a head portion 38 which abuts directly against a recessed seat portion 39 surrounding the holes 37 of the spade drill 10 and a threaded portion 40 which extends into a head section 42 of the tool holder 30. With this design, the screw head 38 does not interfere with the removal of the metal fragments which are removed by the spade drill insert 10 through the fluted sections 44 of the tool holder 30.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

What is claimed is:

1. A spade drill comprising:
   a V-shaped drill cutting end having first and second cutting edges; and
   a pair of reaming edges disposed on each side of said V-shaped drill cutting end, said reaming edges being generally curved.

2. The spade drill according to claim 1, wherein said reaming edges each include a flat in a center portion of the farthest most distant diametrical point of the curved reaming edges.

3. The spade drill according to claim 1, further comprising a radiused portion between said first cutting edge and one of said pair of reaming edges and a radiused portion between said second cutting edge and the other of said pair of reaming edges.

4. The spade drill according to claim 3, wherein the radiused portions are misblended with the first and second cutting edges and said pair of reaming edges.

* * * * *